(12) United States Patent
Notz et al.

(10) Patent No.: US 9,156,199 B2
(45) Date of Patent: Oct. 13, 2015

(54) METHOD FOR OPERATING A HYBRID DRIVE AND HYBRID DRIVE

(75) Inventors: Markus Notz, Schwändi (CH); Markus Lanker, Zürich (CH)

(73) Assignee: NETSTAL-MASCHINEN AG, Naefels (CH)

( * ) Notice: Subject to any disclaimer, the term of this patent is extended or adjusted under 35 U.S.C. 154(b) by 29 days.

(21) Appl. No.: 13/696,527

(22) PCT Filed: May 9, 2011

(86) PCT No.: PCT/EP2011/057420
§ 371 (c)(1),
(2), (4) Date: Nov. 6, 2012

(87) PCT Pub. No.: WO2011/141423
PCT Pub. Date: Nov. 17, 2011

(65) Prior Publication Data
US 2013/0047617 A1    Feb. 28, 2013

(30) Foreign Application Priority Data
May 14, 2010 (DE) .......................... 10 2010 020 573

(51) Int. Cl.
| | |
|---|---|
| F01B 21/04 | (2006.01) |
| F02B 73/00 | (2006.01) |
| B29C 45/50 | (2006.01) |
| F15B 15/08 | (2006.01) |
| B29C 45/76 | (2006.01) |
| B29C 45/82 | (2006.01) |

(52) U.S. Cl.
CPC ........... *B29C 45/5008* (2013.01); *F15B 15/088* (2013.01); *B29C 2045/5068* (2013.01); *B29C 2045/7673* (2013.01); *B29C 2045/824* (2013.01)

(58) Field of Classification Search
CPC ................... B29C 45/5008; B29C 2045/7673; B29C 2045/824; B29C 2045/5068; F15B 15/088
USPC ........... 60/698, 701, 530–531, 414, 706, 711, 60/716, 718
See application file for complete search history.

(56) References Cited

U.S. PATENT DOCUMENTS

| | | |
|---|---|---|
| 5,540,495 A | 7/1996 | Pickel |
| 2004/0065974 A1 | 4/2004 | Dantlgraber |
| 2005/0258795 A1 | 11/2005 | Choi |

(Continued)

FOREIGN PATENT DOCUMENTS

| | | |
|---|---|---|
| DE | 43 44 335 C2 | 6/1995 |
| DE | 101 04 109 A1 | 9/2001 |
| EP | 0 760 277 A1 | 3/1997 |

(Continued)

*Primary Examiner* — Hoang Nguyen
(74) *Attorney, Agent, or Firm* — Henry M. Feiereisen LLC.

(57) ABSTRACT

A hybrid drive includes an electric motor coupled to a hydraulic drive having a double-acting hydraulic piston and a piston rod, and a substantially throttle-less valve for actuating the hydraulic drive, and a control unit for actuating the electric machine. To avoid unnecessary energy consumption, an actuating direction requested by the hybrid drive and a desired actuating force are determined, the valve is switched to a position such that the hydraulic drive is effective in the actuating direction, at least when the actuating force cannot be generated by the electric motor alone, the difference between the force generated by the hydraulic drive and the actuating force is determined, and the electric motor is operated such that the desired actuating force is achieved by adding the force generated by the motor to the force generated by the hydraulic drive, or subtracting the first from the latter.

11 Claims, 2 Drawing Sheets

(56) References Cited

U.S. PATENT DOCUMENTS

2009/0288408 A1* 11/2009 Tozawa et al. .................. 60/435
2011/0100309 A1* 5/2011 Epshteyn ........................ 123/66

FOREIGN PATENT DOCUMENTS

| | | |
|---|---|---|
| JP | 04189525 | 7/1992 |
| WO | WO 02/064345 A1 | 8/2002 |

* cited by examiner

METHOD FOR OPERATING A HYBRID DRIVE AND HYBRID DRIVE

CROSS-REFERENCES TO RELATED APPLICATIONS

This application is the U.S. National Stage of International Application No. PCT/EP2011/057420, filed May 9, 2011, which designated the United States and has been published as International Publication No. WO 2011/141423 and which claims the priority of German Patent Application, Serial No. 10 2010 020 573.7, filed May 14, 2010, pursuant to 35 U.S.C. 119(a)-(d).

BACKGROUND OF THE INVENTION

The present invention relates to a method for operating a hybrid drive and such hybrid drive.

Hybrid drives for driving movable elements of machine tools, in particular also of injection molding machines, are generally known. For example, it is known to provide a drive, for example for an axial feed, composed of both an electric and a hydraulic partial drive for driving the plasticizing and injection unit of an injection molding machine. Reference is hereby made to DE 43 44 335 C2, wherein in one embodiment, the driving force produced by a combination of electric motors is hydraulically supported.

A similar device of a combination of hydraulic with an electric drive for the axial feed is known from JP 04189525.

In addition, reference is made to EP 760 277 which discloses a control method for the hydraulic support of an electric drive, wherein pressure is applied to a hydraulic piston via a storage device for a pressurized medium when a defined control valuable that corresponds to a defined load state of the electric motor has been reached. The pressure increase in the cylinder is hereby proportional to the load on the electric motor.

DE 101 04 109 A1 discloses another control method for the hydraulic support of an electric drive for an axially movable machine part in an injection molding machine. Both the force from an electric motor, wherein the rotation of the electric motor is converted by a gear into a longitudinal motion, and the force from the piston of a hydraulic cylinder operate on the axially movable machine part in the longitudinal direction. The force applied by the electric motor is limited to a value that prevents damage to the gear. The force component generated by the electric motor is limited by forming a control deviation from the desired value for the force operating in the axial direction on the machine element and the actual value of this force, with the control deviation controlling the sum of the force portions operating on the machine element in the axial direction. A desired value for the force operating in the axial direction on the piston is formed from the actual value of the force operating in the axial direction on the machine element and a value which takes into account the mechanical loading capacity of the gear. A control deviation is formed from the desired value for the force operating in the axial direction on the piston and its actual value, which controls a force portion operating on the machine element in the axial direction.

Disadvantageously, the hydraulic cylinders are typically controlled with proportional valves which determine the forward and backward movement commensurate with their control. Such control ensures that the movement in a predetermined application occurs at a predetermined speed. The speed with which the hydraulic cylinder moves is here proportional to the volume flow. A volume flow of different size can be produced by deflecting the valve more or less. On the other hand, a less rapid displacement of the cylinder also corresponds to a higher degree of throttling during the flow through the valve, which disadvantageously converts excess energy that would otherwise be available into heat which is then lost.

SUMMARY OF THE INVENTION

It is therefore an object of the present invention to realize with a hybrid drive a drive having the highest possible energy efficiency.

According to one aspect of the invention, this object is attained with a method for operating a hybrid drive having an electric machine and a hydraulic drive with a hydraulic piston and a piston rod coupled with the electric machine. The hydraulic drive controls a valve or a valve combination, and a control device (10) for controls the electric machine. The method includes the steps of determining an operating direction and an operating force requested by the hybrid drive, switching the valve or the valve combination into a position such that the hydraulic drive is effective in the determined operating direction, determining the difference of the force generated by the hydraulic drive and the requested operating force, and operating the electric machine in such a manner that the requested operating force is attained by adding the force produced by the electric machine to or subtracting the force produced by the electric machine from the force produced by the hydraulic drive. The electric machine is driven when the hydraulic drive is braked, wherein the electric machine is operated in generator mode and regenerated electric energy is produced, with the regenerated electric energy being supplied for further use.

According to another aspect of the invention, this object is also attained with a hybrid device having an electric machine, a hydraulic drive with a hydraulic piston and a piston rod coupled with the electric machine, a valve or a valve combination for controlling the hydraulic drive, and a control device for controlling the electric machine. The control device is configured to build up with the electric machine a force operating in the same direction as the hydraulic drive, in which case the electric machine is operating as a motor, or to build up with the electric machine a force acting in the opposite direction as the hydraulic drive, in which case the electric machine operates as a generator, or to switch the electric machine in a non-force-transmitting mode such that the combination of the effect of the electric machine and the hydraulic drive attains a predetermined value of the operating force, wherein electric energy can be produced with the electric machine operating as a generator, with the regenerated electric energy being supplied for further use.

The present invention is based on the concept that the employed valve is only a simple valve (e.g., switching valve, proportional valve, etc.) or a combination of valves with only a minimal throttling effect or restriction in cross-section, so that almost no energy is lost due to line losses or throttling losses in the valve itself. The conventional control or regulation of the valve is now taken over by the electric machine which is either directly or indirectly connected with the hydraulic cylinder and/or the piston rod via a gear. The electric machine may operate as a motor or a generator. With the electric machine, which depending on the control can operate as a drive (motor) or as a generator, a force can be applied to the hydraulic piston either in the direction of motion or against the direction of motion. In the first case, the force produced by the electric motor is added to the force of the hydraulic drive. In the second case, the generator is driven by the hydraulic drive, which reduces the force originally provided by the hydraulic drive and produces a smaller resulting force.

Instead of converting the excess energy into heat at a throttle location, as in conventional applications using a proportional valve, the excess hydraulic energy is regenerated with the present invention into electric energy, wherein the electric energy is subsequently stored in other axes or components or by an intermediate circuit, and can then be reused. The present principle is hence based on the recovery of the excess hydraulic energy, wherein the electric machine operates as generator and replaces the function of a proportional valve.

It will be understood that the electric machine may not only be used for braking, but may also used to support an additional force buildup—as described above. This has the advantage that the hydraulic drive may have a smaller size commensurate with the capacity of the electric machine.

In a particular embodiment, the hydraulic cylinder may be switchable into an idle mode, with the drive then provided only by the electric machine operating as an electric motor.

When the hydraulic cylinder is operated with an accumulator, high dynamic effects can be attained with such drives. The mechanically coupled generator can convert the excess energy into electricity. If the hydraulic cylinder must be held stationary at its position, then the two pressure chambers may be relieved or short-circuited. In particular, the electric motor operating in a supportive role may be used during positioning.

Additional advantages can be realized with the proposed hybrid drive. In particular, the generally known advantages of the electric drive may be utilized. For example, a direct optimized speed control may be achieved, which advantageously improves the control accuracy. As already mentioned above, the excess energy may be recovered, which simultaneously reduces heating of the drive. The proposed drive system is also very compact. In addition, the advantages of the hydraulic (for example, large force buildup, high dynamics and extended holding times of the force) remain unchanged.

In an injection molding machine, such drives may be used for the injection axis, the mold closure, auxiliary controls or generally for cylinders with high dynamic demands.

Both accumulators and pumps (e.g. variable displacement pumps) may be used as drive for the hydraulic drive. Optionally, a combination of accumulators and pumps may be provided.

BRIEF DESCRIPTION OF THE DRAWING

Several actual embodiments of the present invention will now be described with reference to the appended drawing, which shows in FIG. 1 a schematic block diagram of a hybrid drive according to the present invention, wherein the electric machine is only schematically shown, FIG. 2 a schematic diagram of a detail of FIG. 1 with a concrete embodiment of the electric machine, FIG. 3 another schematic diagram of a detail of FIG. 1 with another embodiment of the electric machine, FIG. 4 another schematic diagram of a detail of FIG. 1 with another embodiment of the electric machine, and FIG. 5 a schematic diagram of a pressure booster.

DETAILED DESCRIPTION OF PREFERRED EMBODIMENTS

Figure 1:
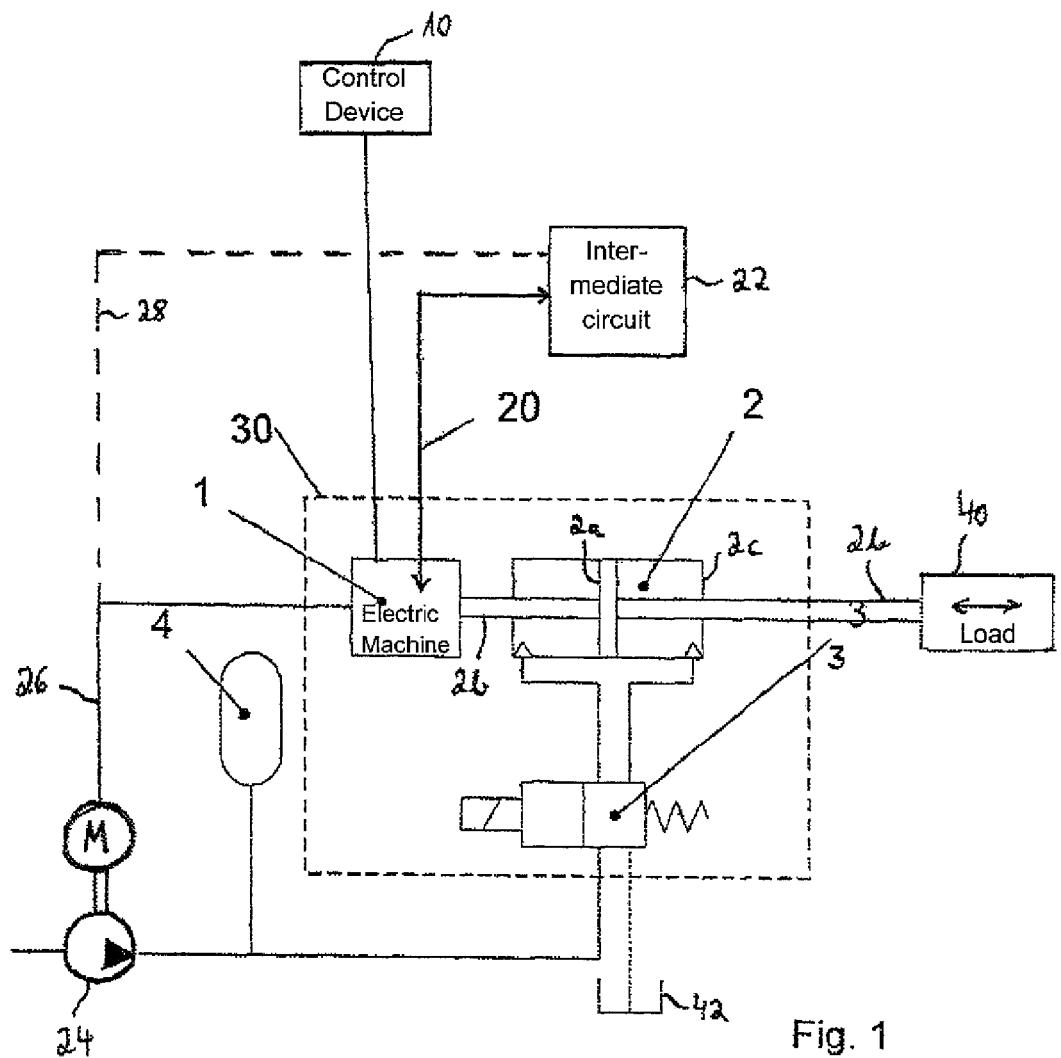

FIG. 1 shows an actual exemplary embodiment according to the present invention.

The reference symbol 30 denotes a compact hybrid drive, showing a hydraulic drive 2 with a double-acting cylinder piston 2a, an electric machine 1 connected with the cylinder piston 2a, and a hydraulic valve (here switching valve) 3 which is configured to supply hydraulic fluid to the two pressure chambers of the cylinder 2c. The electric machine 1 is connected with a control device 10 configured to control the operation of the electric machine 1 and to control the electric machine 1 in a manner described in more detail below. In addition, a supply line 20 is provided with which the regenerated electric energy can be supplied for additional use. For example, an intermediate circuit 22 may be provided in which the regenerated electric energy may be stored until it is required again. The electric energy may be supplied from the intermediate circuit 22 via the supply line 20 to the electric machine 1. However, alternatively, a pump 24 for charging the hydraulic accumulator 4 may also be driven with the regenerated electric energy, as will be described below.

The hydraulic drive 2 includes a cylinder 2c, in which the double-acting cylinder piston 2a is received for back and forth movement. The piston rod 2b of the cylinder piston 2a exits the outside of the cylinder 2c on both sides, with one side being directly connected with the electric machine 1. The other side of the piston rod 2b is operatively connected with an axially displaceable actuating element 40 and/or with a load 40. The hydraulic drive 2 can be constructed as a synchronous cylinder or as a differential cylinder. In addition, a single acting cylinder piston or a single acting hydraulic cylinder may be provided, for example when the electric motor 1 is arranged between the hydraulic drive 2 and the load 40.

The hydraulic valve 3 is composed of at least one two-way valve having at least two valve positions in which hydraulic fluid—as illustrated—can be supplied into the two chambers on both sides of the double-acting piston 2a. The inlet of the hydraulic valve 3 is connected with an accumulator 4, and the outlet is connected with a vessel or tank 42 for the hydraulic fluid. Depending on the switching position, the hydraulic valve 3 may supply hydraulic fluid at least into one or the other pressure chamber and thus apply a specified force to the double-acting piston 2a in one or the other direction.

Figure 2:
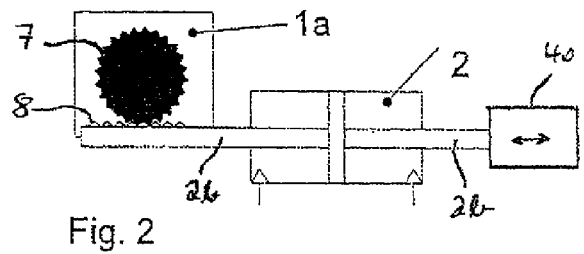
Figure 3:
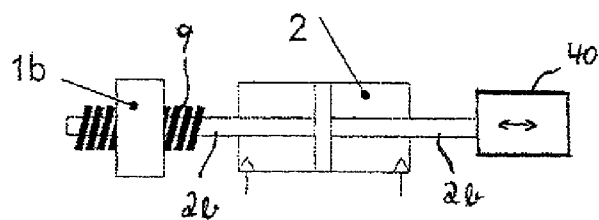
Figure 4:
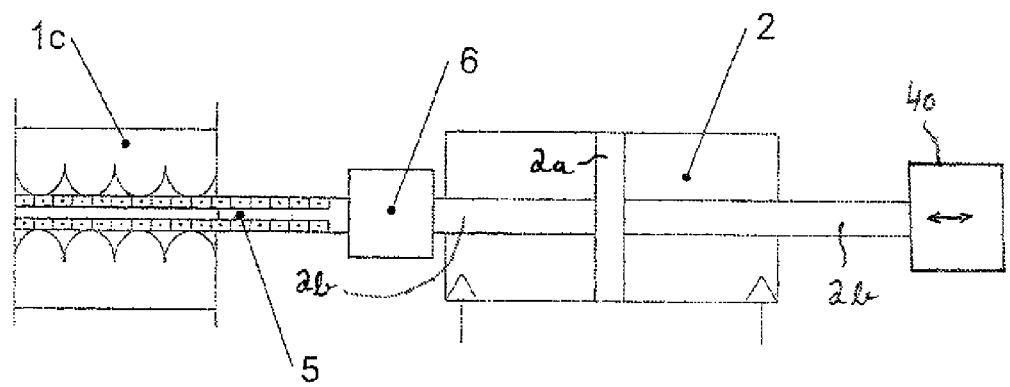

FIGS. 2-4 illustrate additionally concrete embodiments of the electric machine 1 or of the mechanical connection of the electric machine 1 with the piston rod 2b of the hydraulic drive 2.

For example, FIG. 2 shows an electric machine 1a which can be used as both a motor and a generator and whose rotor is coupled directly or via a gear with a pinion 7 which rolls on a toothed part 8 of the piston rod 2b operating as a toothed rack. It will be understood that corresponding pinions 7 rolling on or engaging in associated teeth 8 may also be arranged on both sides of the piston rod 2b for a symmetric application of force. The other end of the piston rod 2b is operatively connected with a load 40.

FIG. 3 shows an electric machine 1 in form of a hollow shaft motor 1b having a rotor with an integral nut that is operatively connected with a spindle 9 arranged on the corresponding part of the piston rod 2a. The other side of the piston rod 2b is operatively connected with a load 40. The rotation of the nut is converted by the spindle 9 into an axial movement of the load 40.

FIGS. 2 and 3 show the rack-pinion-combination and/or the nut-spindle-combination gears which convert the rotation of the electric motor 1 or of the electric machine 1 into a linear movement of the load 40.

Figure 5:
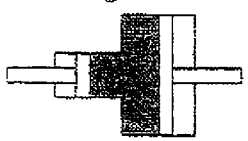

FIG. 4 shows another combination using a gear stage (for example pressure booster), wherein the electric machine may be coupled with the hydraulic cylinder directly (without a gear stage). A linear motor 1c is used as an electric machine 1, having a coil system in which the part of the piston rod 2b equipped with rod magnets 5 is movably supported. The part of the piston rod 2b having the rod magnets 5 is connected with the double-acting piston 2a of the hydraulic drive 2 via a pressure booster 6, with FIG. 5 showing one embodiment of the pressure booster 6 in detail. The other side of the piston rod 2b is operatively connected with the load 40.

All embodiments of FIGS. 1-4 operate in the same manner.

When the actuating element 40 or the load 40 is to be driven, the electric valve 3 is operated so as to supply hydraulic fluid to the pressure chamber of the double-acting piston 2a. Because almost no throttling occurs in the valve 3 itself, the pressure is substantially identical to the pressure in the accumulator 4, taking into account the line cross-sections in the suitably connected pressure chamber. This also applies to the corresponding volume flows of the hydraulic fluid, which are determined by the line cross-sections.

When the actuating element 40 is to be driven only to some extent (e.g. less rapidly or with a smaller force), the electric machine 1 is operated as a generator under control by the control device 10 and simultaneously brakes the hydraulic drive 2, so that the resulting force is smaller than would otherwise be available without the addition of the electric machine 1. The actuating force can be determined and adjusted as desired by suitable control or regulation of the electric machine 1.

The electric energy produced by the electric machine 1 in generator mode can be fed back via the supply line 20 to a system (for example an intermediate circuit 22 as an energy store). Alternatively, a pump 24 can be operated with the electric energy, charging the accumulator 4. This is illustrated in FIG. 1 by the connecting line 26 between the electric machine 1 and a motor M of the pump 24. In this way, the regenerated energy is—except for losses in the efficiency—again stored in the accumulator 4 itself. It will be understood that the pump 24 can also be connected to the intermediate circuit 22 and powered by the electric energy temporally stored in the intermediate circuit 22. This variant is indicated with the dashed line 28. By not "wasting" the excess energy in the valve, less energy is lost overall, and the energy that would otherwise be wasted is again available to the system. Overall, the electric machine 1 and its periphery are hence designed to generate electric energy and feed electric energy back to a system. The electric machine 1 is driven when the hydraulic drive 2 is braked, the recovered energy is converted into electric energy and fed back to a system.

In addition, with the present embodiment, the accumulator 4 and the hydraulic drive may have a smaller size, because the electric drive 1 can also be operated as an electric motor and may in combination with the hydraulic drive 2 increase the driving force of the hydraulic drive 2.

The advantages of both the hydraulic drive (high dynamics) and of the electric drive (high control precision) can be used. However, more particularly, the energy otherwise "wasted" by the proportional valve is not completely lost.

The operative connection between the electric machine 1, subsequently referred to also as electric motor, the hydraulic drive 2, subsequently also referred to as hydraulic cylinder, and the load 40 may be realized in many different ways. In particular, the load 40 may not be arranged exclusively as shown in FIGS. 1 to 4. Instead, the load may also be arranged at other positions in the drive train:
hydraulic cylinder—electric motor—load,
load—hydraulic cylinder—electric motor,
hydraulic cylinder—load—electric motor,
electric motor—load—hydraulic cylinder,
and the like.

The invention claimed is:

1. A method for operating a hybrid drive having an electric machine configured to be operated in generator mode or motor mode and a hydraulic drive with a hydraulic piston and a piston rod in mechanical engagement with the electric machine, the method comprising the steps of:
   determining an operating direction and an operating force requested by the hybrid drive,
   switching a valve or valve combination connected to the hydraulic drive into a position such that the hydraulic drive is effective in the determined operating direction,
   determining a difference between a force produced by the hydraulic drive and the requested operating force,
   when the force produced by the hydraulic drive is smaller than the requested operating force, operating the electric machine in motor mode such that the requested operating force is attained by adding a force produced by the electric machine to the force produced by the hydraulic drive, and
   when the force produced by the hydraulic drive is greater than the requested operating force, driving the electric machine in generator mode by the piston rod, thereby braking the hydraulic drive, and generating regenerated electric energy which is supplied for further use.

2. The method of claim 1, wherein the regenerated electric energy is stored in an intermediate circuit and reused.

3. The method of claim 1, wherein the regenerated electric energy is used to operate a pump which charges a hydraulic accumulator.

4. The method of claim 1, wherein the valve or the valve combination comprises a substantially throttle-less valve or a substantially throttle-less combination of valves.

5. A hybrid drive, comprising:
   an electric machine configured to be operated in generator mode or motor mode,
   a hydraulic drive comprising a hydraulic piston and a piston rod in mechanical engagement with the electric machine and with an actuating element or a load,
   a valve or a valve combination connected to the hydraulic drive and controlling an operating force and an operating direction of the hydraulic drive,
   wherein when the force produced by the hydraulic drive is smaller than a requested operating force of the hybrid drive, the electric machine is operated in motor mode to produce with the electric machine a force acting in an identical direction as the force produced by the hydraulic drive, and
   when the force produced by the hydraulic drive is greater than the requested operating force of the hybrid drive, the electric machine is driven by the piston rod and operated in generator mode to produce with the electric machine a force acting in an opposite direction as the force produced by the hydraulic drive,
   and to generate regenerated electric energy which is supplied for further use.

6. The hybrid drive of claim 5, wherein the valve or the valve combination is substantially throttle-less.

7. The hybrid drive of claim 5, wherein the hydraulic drive is constructed as a synchronous cylinder or as a differential cylinder.

8. The hybrid drive of claim 5, further comprising an intermediate circuit for storing the regenerated electric energy.

9. The hybrid drive of claim 5, further comprising
   a hydraulic accumulator operatively connected with the hydraulic drive, and
   a pump driven by the regenerated electric energy and configured to charge the hydraulic accumulator.

10. The hybrid drive of claim 5, further comprising a pressure booster.

11. The hybrid drive of claim 5, for use in an injection molding machine as a drive for an actuating element, a drive for an injection axis or a drive for mold closure.

* * * * *